(12) United States Patent  (10) Patent No.: US 7,770,767 B2
Bartholdy  (45) Date of Patent: Aug. 10, 2010

(54) MOUNTAIN MIKE'S REPRODUCTIONS ATV GUN RACK/POP-UP SHOOTING REST

(76) Inventor: Michael Richard Bartholdy, 582 Hillside Dr., Cloverdale, CA (US) 95425

( * ) Notice: Subject to any disclaimer, the term of this patent is extended or adjusted under 35 U.S.C. 154(b) by 307 days.

(21) Appl. No.: 11/906,556

(22) Filed: Oct. 3, 2007

(65) Prior Publication Data
US 2009/0090758 A1  Apr. 9, 2009

(51) Int. Cl.
F41C 27/22  (2006.01)

(52) U.S. Cl. ............... 224/401; 224/484; 224/282; 224/913; 42/94; 89/37.04

(58) Field of Classification Search ............... 224/401, 224/408, 420, 282, 548, 553, 913, 484, 486; 42/94; 211/64; 89/37.04
See application file for complete search history.

(56) References Cited

U.S. PATENT DOCUMENTS

| | | | | |
|---|---|---|---|---|
| 4,967,497 A * | 11/1990 | Yakscoe | ................... | 42/94 |
| 5,845,427 A * | 12/1998 | Taylor | ................... | 42/94 |
| 5,876,005 A * | 3/1999 | Vasconi | ................... | 248/276.1 |
| 5,913,668 A * | 6/1999 | Messer | ................... | 42/94 |
| 6,843,395 B1 * | 1/2005 | Martin et al. | ................... | 224/401 |
| 6,931,777 B1 * | 8/2005 | Krien | ................... | 42/94 |
| 6,935,064 B1 * | 8/2005 | Thompson | ................... | 42/94 |
| 6,945,441 B2 * | 9/2005 | Gates et al. | ................... | 224/401 |
| 7,066,365 B2 * | 6/2006 | Brown | ................... | 224/401 |
| 7,086,192 B2 * | 8/2006 | Deros | ................... | 42/94 |
| 7,536,820 B2 * | 5/2009 | Wade et al. | ................... | 42/94 |
| 7,549,247 B1 * | 6/2009 | Reese | ................... | 42/94 |
| 2002/0060232 A1 * | 5/2002 | Stenger et al. | ................... | 224/401 |
| 2004/0237372 A1 * | 12/2004 | Frye | ................... | 42/94 |
| 2008/0047188 A1 * | 2/2008 | Lindstrom | ................... | 42/94 |

* cited by examiner

Primary Examiner—Justin M Larson

(57) ABSTRACT

A convertible gun carrier is to be mounted on a front of an ATV (all-terrain vehicle) which quickly transitions from a horizontal gun rack position to a vertical gun rest position. This gun carrier holds a gun or rifle securely during ATV travel and also doubles as a shooting rest when the ATV is stopped.

1 Claim, 4 Drawing Sheets

MOUNTAIN MIKE'S REPRODUCTIONS ATV GUN RACK/POP-UP SHOOTING REST

BACKGROUND OF INVENTION

The present invention relates to gun carriers for holding a gun or rifle on an ATV (all-terrain vehicle). While traveling on an ATV with a firearm, it is important to use a secure designated gun rack. When shooting a firearm, it is important to make safe, steady shots, clear of obstruction. Unlike other ATV gun racks, the convertible gun carrier of the present invention has the ability to pop up from a horizontal gun rack position to a vertical gun rest position via a gas lifting spring.

BRIEF SUMMARY OF THE INVENTION

The convertible gun carrier of the present invention can be mounted to an ATV so as to pop up to the left for left handed shooters. The gun carrier can also be mounted to an ATV so as to pop up to the right for right handed shooters. A gun cradle of the gun carrier is capable of rotating 360 degrees when the gun rack is in the vertical gun rest position. The gun carrier, when in the vertical gun rest position, can be used as a shooting rest by users both mounted on the stationary ATV and users dismounted from the ATV. While the ATV is traveling, the gun carrier is securely locked in the horizontal gun rack position via a hold down clamp. When the ATV is stationary and a user wishes to utilize the shooting rest, the hold down clamp is released and one end of the gun carrier pops up via a gas lifting spring. After use, the user simply pushes the end of the gun carrier back down into the horizontal gun rack position and the hold down clamp locks the carrier in place.

DETAILED DESCRIPTION OF THE INVENTION

Figure 1:
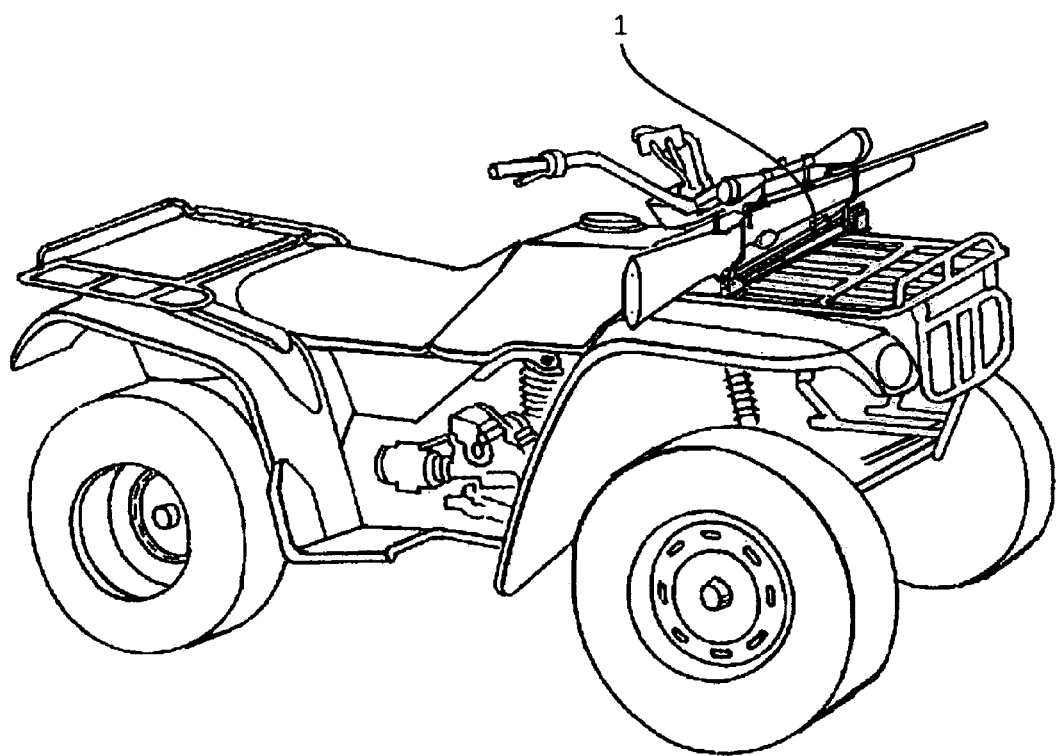
FIG. 1 is a side/front perspective view of an ATV with the convertible gun carrier of the present invention mounted thereto, the gun carrier being in the horizontal gun rack position.
Figure 2:
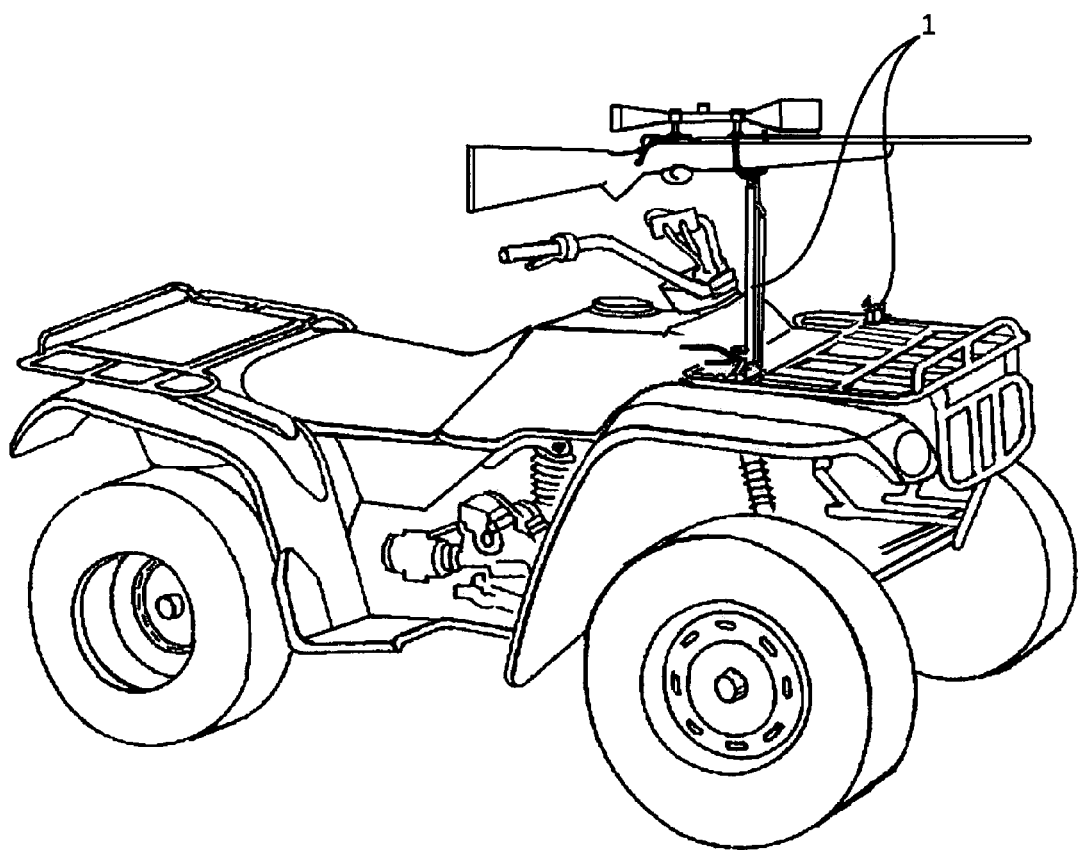
FIG. 2 is a side/front perspective view of an ATV with the convertible gun carrier of the present invention mounted thereto, the gun carrier being in the vertical gun rest position.
Figure 3:
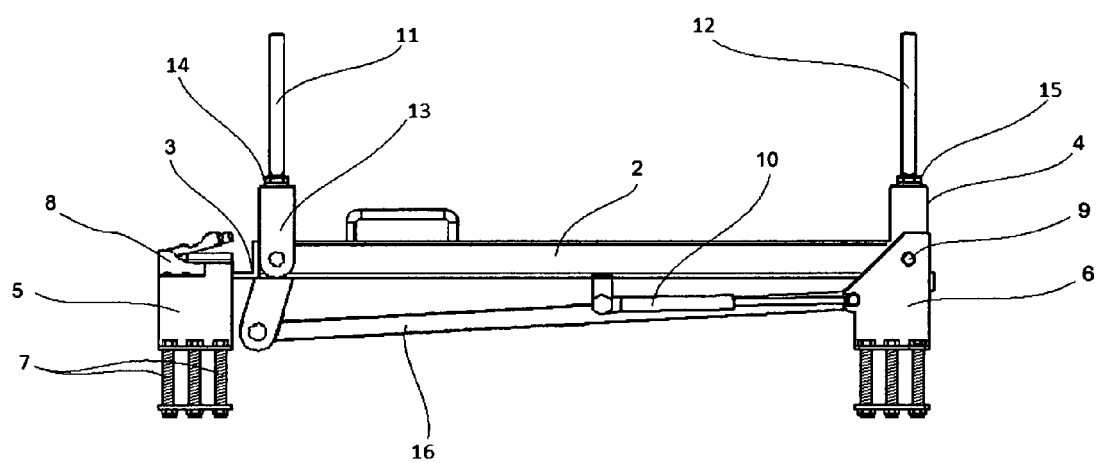
FIG. 3 is an enlarged front perspective view of the convertible gun carrier of the present invention, the gun carrier being in the horizontal gun rack position.
Figure 4:
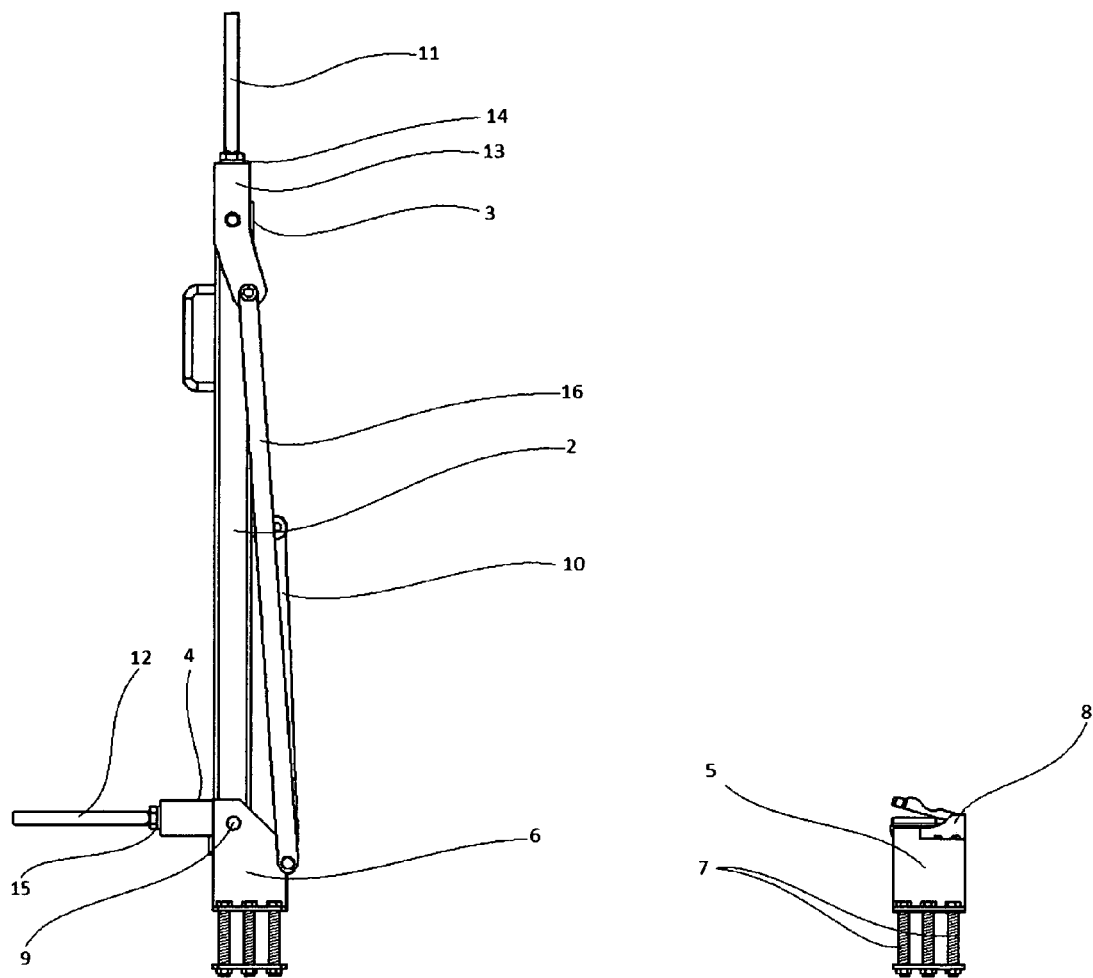
FIG. 4 is an enlarged front perspective view of the convertible gun carrier of the present invention, the gun carrier being in the vertical gun rest position.

The convertible gun carrier (1) of the present invention includes a frame member (2) having a first end (3) and a second end (4). The first end (3) of the frame is mounted to an ATV via a first mounting structure (5) and the second end (4) of the frame is mounted to the ATV via a second mounting structure (6). The mounting structures can be secured to the ATV using U-bolts (7). The first end (3) of the frame is releasably mounted to the first mounting structure (5) via a hold down clamp (8) that releasably locks the first end (3) of the frame member (2) to the first mounting structure (5). The hold down clamp (8) can be in the form of a cam clamp. When locked in place, the gun carrier is held in the horizontal gun rack position as shown in FIGS. 1 and 3. The second end (4) of the frame is pivotally mounted to the second mounting structure (6) via a hinge point (9). When the hold down clamp (8) is released, the frame is allowed to pivot about the hinge point (9) to transition the gun carrier into the vertical gun rest position as shown in FIGS. 2 and 4.

A gas spring (10) is connected between the second mounting structure (6) and the frame. Upon release of the hold down clamp (8), the gas spring (10) urges the frame upward, causing the gun carrier to pop up from the horizontal gun rack position to the vertical gun rest position.

The frame member (2) has two gun cradles (11,12) mounted thereto. A first gun cradle (11) is pivotally attached to the first end (3) of the frame member (2) via a pivot cradle base (13). The pivot cradle base (13) allows the first gun cradle (11) to pivot about a horizontal axis so as to always maintain a vertical orientation as will be explained below. The first gun cradle (11) is attached to the pivot cradle base (13) via a swivel joint (14) which allows the first gun cradle (11) to rotate 360 degrees about a vertical axis. A second gun cradle (12) is fixedly attached to the second end (4) of the frame member (2) via a fixed cradle base (15). In the horizontal gun rack position, both gun cradles extend vertically away from the frame member (2) as seen in FIGS. 1 and 3. In the vertical gun rest position, the first gun cradle (11) extends vertically away from the frame member (2) and the second gun cradle (12) extends horizontally away from the frame member (2) as seen in FIGS. 2 and 4.

A lever (16) is connected between the second mounting structure (6) and the pivot cradle base (13). As the frame member (2) rotates about the hinge point (9), the lever (16) causes the pivot cradle base (13) to rotate about the frame member (2) in order to maintain a vertical orientation of the first gun cradle (11) so that it can be used as a gun rest in the vertical gun rest position.

In use, an ATV rider releases the hold down clamp (8) to free the first end (3) of the frame member (2) from the first mounting structure (5). After the hold down clamp (8) is released, the gas spring (10) urges the frame member (2) upward and transitions the convertible gun carrier from the horizontal gun rack position to the vertical gun rest position. In the vertical gun rest position, a user can use the swiveling first gun cradle (11) to make a safe, steady shot. When it is time to store the firearm once again, the user simply pushes the frame member (2) downward until the hold down clamp (8) is engaged and the convertible gun carrier is held in the horizontal gun rack position.

What is claimed is:

1. A convertible gun carrier mounted to an all-terrain vehicle, the convertible gun carrier being movable between a horizontal gun rack position for use in transporting a gun during vehicle travel and a vertical gun rest position for use in providing a shooting rest when the vehicle is stopped, the convertible gun carrier comprising:

a frame member having a first end and a second end, wherein the first end is releasably mounted to a first mounting structure on the all-terrain vehicle and the second end is pivotally mounted to a second mounting structure on the all-terrain vehicle via a hinge point;

a hold down clamp that releasably locks the first end of the frame member to the first mounting structure, wherein the hold down clamp serves to lock the convertible gun carrier in the horizontal gun rack position and wherein release of the hold down clamp allows the convertible gun carrier to pivot about the hinge point and into the vertical gun rest position;

a gas spring connected between the second mounting structure and the frame member, wherein the gas spring urges the convertible gun carrier into the vertical gun rest position upon release of the hold down clamp;

a first gun cradle pivotally attached to the first end of the frame member via a pivot cradle base and a second gun cradle fixedly attached to the second end of the frame member via a fixed cradle base, wherein the first and second gun cradles each extend in a vertical direction away from the frame member when the convertible gun carrier is in the horizontal gun rack position;

a lever connected between the second mounting structure and the pivot cradle base, wherein the lever causes the first gun cradle to automatically pivot about the first end of the frame member during transition of the convertible gun carrier from the horizontal gun rack position to the vertical gun rest position such that the first gun cradle also extends in a vertical direction away from the frame member when the convertible gun carrier is in the vertical gun rest position.

* * * * *